United States Patent [19]

Tashiro

[11] 3,780,506
[45] Dec. 25, 1973

[54] HARVESTER DRIVE SYSTEM
[75] Inventor: Donald K. Tashiro, Hamilton, Ontario, Canada
[73] Assignee: International Harvester Company, Chicago, Ill.
[22] Filed: Aug. 1, 1972
[21] Appl. No.: 276,984

[52] U.S. Cl............................. 56/14.5, 56/DIG. 1
[51] Int. Cl............................................ A01d 45/02
[58] Field of Search.................... 56/1, DIG. 1, 14.4, 56/14.5

[56] References Cited
UNITED STATES PATENTS
3,324,639  6/1967  Halls et al...................... 56/DIG. 1
3,550,363  12/1970 Halls et al........................... 56/14.4
3,300,953  1/1967  Glass................................ 56/DIG. 1
3,412,535  11/1968 Drummond......................... 56/14.5

Primary Examiner—Antonio F. Guida
Attorney—Floyd B. Harman

[57] ABSTRACT

A pull-type windrower having a crop harvesting platform floatably mounted on a wheeled frame adapted to be coupled behind a tractor. The platform includes a cutter, a reel, a pair of crop-conveying augers, and a pair of crop conditioning rolls for cutting a standing crop, consolidating and conditioning the same, and depositing the crop onto the ground in a windrow. The windrower includes a power drive system for driving the above-mentioned components from the power takeoff (PTO) drive of the tractor.

9 Claims, 4 Drawing Figures

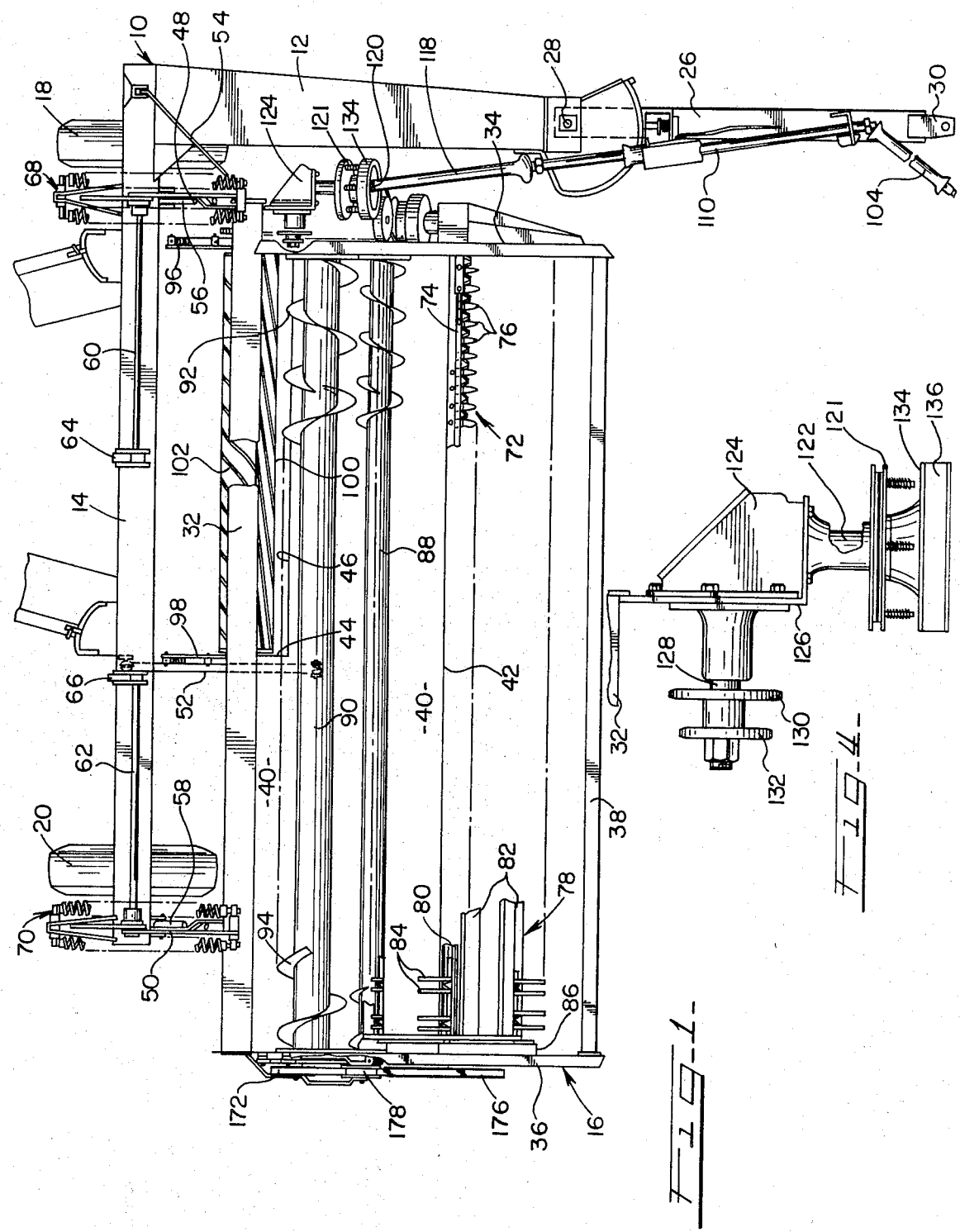

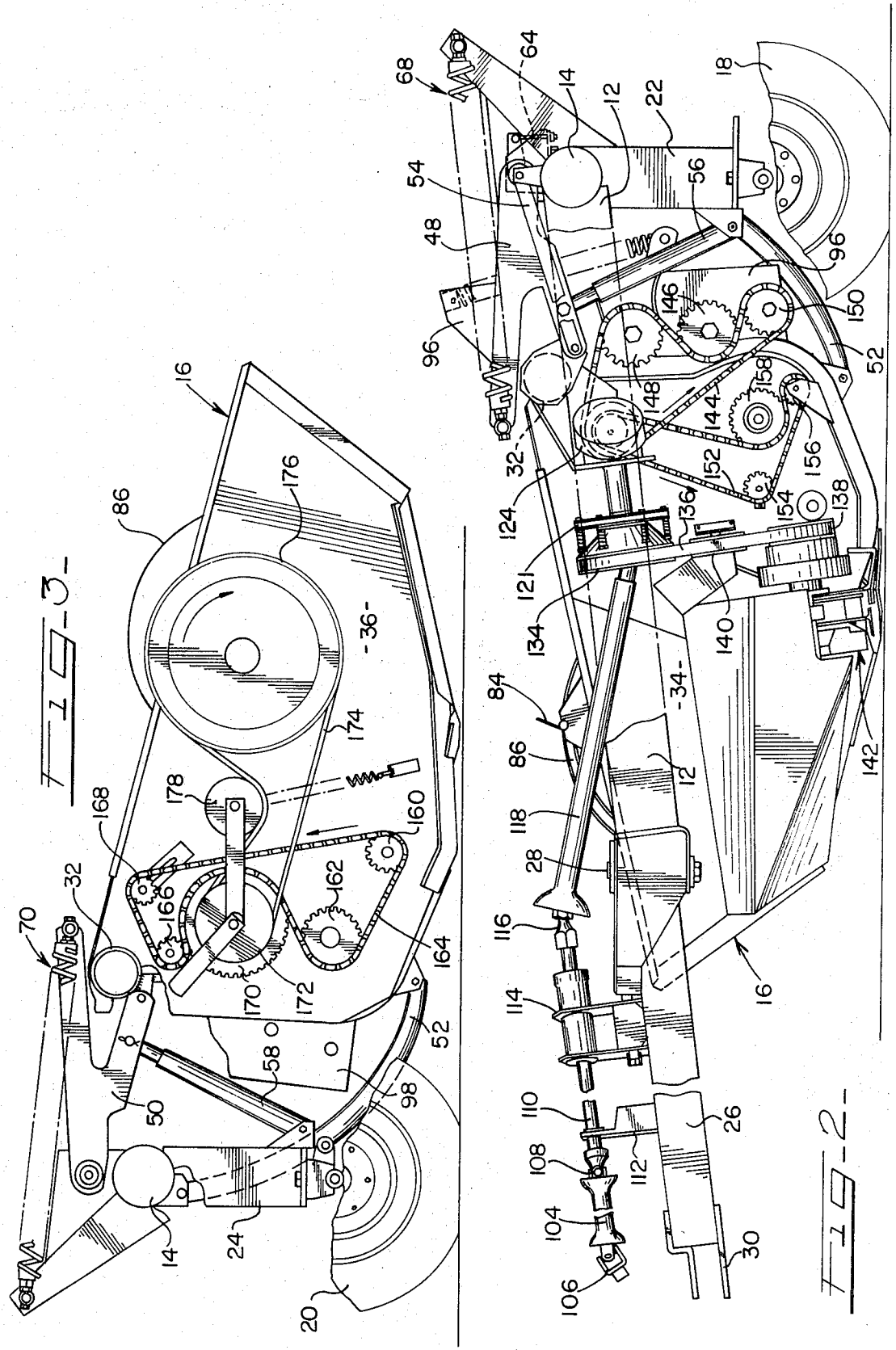

HARVESTER DRIVE SYSTEM

BACKGROUND OF THE INVENTION

1. Field of the Invention

The invention relates generally to crop harvesting machines of the type which cut a standing crop, condition the same, and deposit the crop onto the ground in a swath or windrow. More particularly the invention relates to an improved power drive system for the crop-handling components of the harvesting machine.

2. Prior Art

The problems associated with the design of the drive system of the typical mower conditioner as described in U.S. Pat. No. 3,473,305 for example, become even more complex where the harvesting machine in addition includes crop-conveying structure for consolidating the crop on the platform prior to conditions the same. Problems may be encountered with the suspension and counterbalancing of a harvester platform which has all or nearly all of the drive components disposed at one end thereof. In such a case the center of gravity of the platform is disposed significantly nearer one end of the platform than the other and the suspension and counterbalancing system may be more complex as a result.

Further problems concerning the disposition of drive components relate to difficulties in manufacturing the machine and in subsequent servicing and repair of the drive components particularly when the components are disposed in congested relation within a limited space. A fundamental problem concerns the cost of the overall drive system particularly where the harvesting machine includes a multiplicity of power driven crop-handling components.

SUMMARY

The invention provides an improved drive system for the crop-handling components of a harvesting platform, the components including a pair of crop-conveying augers. One of the augers is utilized not only as an element for conveying crop material along the platform but as a means for transmitting power to other components as well. By this arrangement certain of the crop handling components are driven from one end of the platform and certain other of the components are driven at the opposite end thereof. This dispersement of the various drive system elements results in better weight distribution on the platform and easier access for repair and servicing of the elements.

Briefly, the objects of the invention are to provide an improved drive system for a crop harvesting platform wherein: the drive elements are positioned to improve the weight distribution on the platform; one of the components of the platform for conveying the crop therealong is utilized as a power-transmitting element with the result of simplifying the overall drive system; the drive elements are dispersed to provide easier access for servicing and repair; the drive system delivers power to a multiplicity of crop-handling components without requiring a multitude of relatively expensive items such as overrunning clutches or the like.

BRIEF DESCRIPTION OF THE DRAWINGS

FIG. 1 is a plan view of the harvesting machine in accordance with the invention;

FIG. 2 is an end elevation view of the windrower of FIG. 1;

FIG. 3 is an end elevation view of the opposite end of the windrower; and,

FIG. 4 is an enlarged fragmentary plan view of a portion of the drive system of FIG. 1.

DESCRIPTION OF THE PREFERRED EMBODIMENT

Referring first to FIG. 1 there is shown a pull-type windrower which includes a wheel-supported L-shaped main frame 10 having a forwardly extending leg 12 and a transversely extending leg 14. A crop harvesting platform 16 is supported from the frame 10 forwardly of the frame leg 14 and adjacent to the leg 12. The windrower frame 10 is supported on a pair of wheels 18 and 20 journaled respectively at the lower end of a pair of vertical frame sections 22 and 24 secured to the underside of the frame leg 14. A hitch tongue 26 is pivotally connected at 28 to the forward end of the frame leg 12 and includes a hitch clevis 30 for coupling the windrower to a towing tractor.

The platform 16 includes an elongated beam 32 of tubular section disposed along the upper rear edge of the platform and extending the length thereof. A pair of vertical walls 34 and 36 extend forwardly in parallel relation from respective opposite ends of the beam 32 to define the inboard and outboard end respectively of the platform. A so-called "lean bar" 38 is connected between the front edges of the walls 34 and 36 so as to extend along the length of the platform to engage a standing crop. It will of course be understood that the bottom and rear portions of the platform are defined by suitable sheet metal structure 40 disposed between the walls 34 and 36 and having a forward edge 42 and extending rearwardly and curving upwardly into connection with the beam 32. As shown generally in FIG. 1 the sheet metal structure 40 extends along the rear of the platform from the outboard wall 36 to an edge 44 extending downwardly from the beam 32. The sheet metal structure 40 includes another edge 46 extending longitudinally along the lower rear portion of the platform from the edge 44 to the inboard wall 34. It will be seen that the beam 32, edges 44 and 46, and the inboard wall 34 define a generally rectangular opening through which the crop is discharged during a harvesting operation.

Having described the basic framework of the platform 16, the means for supporting the platform from the frame 10 will now be briefly described. An upper support arm 48 is pivotally supported from the frame leg 14 and extends forwardly into pivotal connection with the beam 32 proximate to the inboard end of the platform. Similarly an upper support arm 50 is pivotally supported from near the outboard end of the frame leg 14 and extends forwardly into pivotal connection with the beam 32. An intermediate link 52 is pivotally coupled to the underside of the frame leg 14 intermediate the support arms 48 and 50 and extends downwardly and forwardly into pivotal connection with the lower rear portion of the platform. In addition to the basic 3-point linkage system above described, a stabilizer bar 54 is pivotally coupled between the frame leg 14 and the platform beam 32 to restrict lateral movement of the platform relative to the frame 10 of the windrower.

The platform 16 is movable vertically between a lowered operative position and a raised transport position by a pair of hydraulic cylinder units 56 and 58 coupled between the frame section 22 and the arm 48, and the frame section 24 and the arm 50, respectively. The cylinder units 56 and 58 are of course a part of a hydraulic power system incorporated within the towing tractor.

The disclosed windrower is of the type which includes means for floatably suspending the platform for movement in response to variations in the level of the ground engaged by the platform during operation. A pair of elongaged torsion bars 60 and 62 are disposed coaxially above the frame leg 14 in connection with the platform support arms 48 and 50 respectively. The bars 60 and 62 include adjustment assemblies 64 and 66 respectively for adjustably holding the ends of the bars against rotation imparted to the other ends thereof by downward pivoting movement of the arms 48 and 50. In addition to the torsion bars, a pair of coil spring assemblies 68 and 70 is connected between the frame structure 10 and the arms 48 and 50 respectively. The torsion bars and spring assemblies cooperate to provide a force generally counter-balancing the weight of the platform to thus facilitate the requisite floatability of the platform.

The platform 16 includes a plurality of crop-handling components which cooperate to cut a standing crop, consolidate the crop into a narrow mass or stream, condition the crop, and finally deposit the same onto the ground in a windrow for subsequent drying or curing. A cutter assembly 72 is disposed along the edge 42 of the bottom of the platform along the entire length between the end walls 34 and 36. The cutter assembly 72 is of conventional construction including a reciprocable sickle bar 74 and a plurality of fixed sickle guards 76.

Journaled in the end walls 34 and 36 and disposed above the cutter assemblies 72 is a crop gathering reel 78 of conventional construction. The reel includes a central shaft 80, a plurality of crop-engaging bats 82, and a plurality of rod-mounted fingers 84. The reel 78 is of the well known type in which the orientation of the fingers 84 is controlled by crank arms and rollers (not shown) guided from a cam track 86 of channel section mounted on the inside of the end wall 36.

Auger conveyers 88 and 90 are journaled in the end walls 34 and 36 so as to extend along the platform in parallel relation. The rearmost auger 90 is preferably of greater diameter than the frontmost auger 88 and is journaled at an elevation somewhat above the axis of the frontmost auger. Each of the augers 88 and 90 includes helical flighting 92 and 94 of opposite pitch respectively extending inwardly from the respective opposite ends of each auger. It will be seen that the flighting 94 extends from the outboard end of the platform to a point beyond the center of the above-described crop discharge opening. The flighting 92 extends from the inboard end of the platform to a point proximate to the end of the other flighting 94.

The windrower includes means for conditioning the crop before the same is deposited onto the ground in a windrow. A pair of vertical plates 96 and 98 project rearwardly from adjacent the end wall 34 and edge 44 respectively so as to be disposed at opposite ends of the crop discharge opening. Cylindrical conditioner rolls 100 and 102 are journaled in the plates 96 and 98 so as to extend across the crop discharge opening. The rolls 100 and 102 are disposed in closely spaced parallel relation so as to receive the crop material therebetween. In accordance with conventional practice, one of the rolls is preferably mounted for movement toward and away from the other to accommodate varying thickness of the crop material.

In accordance with the present invention the above-mentioned crop-handling components are adapted for powered operation. Power is transmitted from the PTO of the towing tractor to a first shaft 104 having a universal joint and coupling 106 at its forward end for connection to the tractor. The telescopic shaft 104 is coupled by a universal joint 108 to a second shaft 110 which is supported on the draft tongue 26 by front and rear brackets 112 and 114. The shaft 110 is connected by a universal joint 116 to a telescopic shaft 118 which is in turn connected by a universal joint 120, through a slip clutch 121, to an input shaft 122 of a right angle gear box 124. As best shown in FIG. 4 the gear box 124 is secured to the platform by means including an L-shaped plate 126 welded to the end of the beam 32. The gear box includes an output shaft 128 on which is mounted a pair of drive sprockets 130 and 132.

The cutter 72 is power driven through means to be now described. A pulley 134 is disposed coaxially with the input shaft 122 and is driven by the shaft 118. Power is transferred downwardly through a belt 136 to a pulley 138 journaled on the end wall 34. An idler pulley 140 maintains the requisite tension on the belt 136. The pulley 138 drives a cutter drive unit 142 which may be identical in construction with the drive unit 88 shown and described in detail in U.S. Pat. No. 3,412,538.

The conditioner rolls 100 and 102 are driven in opposite directions at relatively high speeds from the sprocket 130 through a drive chain 144 trained about sprockets 146 and 148 mounted on the rolls 100 and 102 respectively. An idler sprocket 150 is arranged with the chain 144 so as to dispose the chain in proper driving engagement with the sprockets 146 and 148 as shown.

The rearmost auger 90 is driven from the sprocket 132 through a drive chain 152 engaging a pair of idler sprockets 154 and 156 which dispose the chain in driving engagement with a sprocket 158 on the end of the auger 90. The power is transmitted by the auger 90 across the platform to the outboard end thereof shown in FIG. 3.

Power is transmitted from the outboard end of the auger 90 to the frontmost auger 88 and to the reel 78 by means to be now described. Sprockets 160 and 162 are secured on the outboard ends of the augers 88 and 90 respectively. A drive chain 164 drivingly interconnects the sprockets 166 and 162 as shown. The chain 164 is arranged in conjunction with a pair of idler sprockets 166 and 168 to drivingly engage a relatively large diameter sprocket 170 journaled on the end wall 36. A pulley 172 is connected to the outboard side of the sprocket 170 so as to be driven thereby. A belt 174 transmits power from the pulley 172 to a large diameter pulley 176 secured to the central shaft 80 (FIG. 1) of the reel 78. A spring loaded idler pulley 178 maintains proper tension on the belt 174.

In operation, power is transmitted from the PTO of the towing tractor to the windrower through the shafts 104, 110 and 118. The sickle bar 74 is reciprocated through the actuation of the cutter drive unit 142 from the drive belt 136. Power is transmitted through the gear box 124 to the conditioner rolls 100 and 102 and rearmost auger 90 at the inboard end of the platform. The auger 90 transfers power to the outboard side of the platform where power is transmitted to the frontmost auger 88 and to the reel 78. As the windrower is pulled forwardly the crop is cut by the cutter 72 and swept rearwardly by the reel 78 onto the auger 88 and 90. The crop is conveyed along the platform by the augers and moved rearwardly thereby through the crop discharge opening and between the conditioner rolls. The rolls crush or crimp the crop material and project the same rearwardly onto the ground.

In summary the power drive system of the invention provides a simple and effective means for driving a multiplicity of crop-handling components commensurate with the objects of the invention.

What is claimed is:

1. A crop harvesting machine adapted for powered operation by a tractor having a power take-off (PTO) means, comprising: a wheeled frame adapted for coupling to the tractor in trailing relation thereto; a crop harvesting platform on said frame including a pair of crop-conveying augers one behind the other disposed in a direction transverse to the forward direction of travel of the machine for conveying the crop in the transverse direction; means for driving one of said augers from the PTO at one side of said platform; and means for transmitting power from said one auger to the other of said augers at an opposite end of said platform.

2. The subject matter of claim 1, wherein said crop harvesting platform includes a crop-gathering reel disposed in parallel relation to said augers; and means for transmitting power from said other auger to said reel at said opposite side of said platform.

3. A crop harvesting machine adapted for powered operation by a tractor having a power take-off (PTO) means, comprising: a wheeled frame adapted for coupling to the tractor in trailing relation thereto; a crop harvesting platform on said frame including a pair of crop-conveying augers disposed transversely to the forward direction of travel of the machine, said augers being disposed in parallel relation one behind the other; means for driving the rearmost of said augers from the PTO at one side of said platform; and means for transmitting power from said rearmost auger to the frontmost auger at an opposite side of said platform.

4. The subject matter of claim 3, wherein said crop harvesting platform includes a crop-gathering reel disposed in parallel relation to said augers; and means for transmitting power from said frontmost auger to said reel at said opposite side of said platform.

5. A crop harvesting machine adapted for powered operation by a tractor having a power take-off (PTO) means, comprising: a wheeled frame adapted for coupling to the tractor in trailing relation thereto; a crop harvesting platform on said frame including a cutter disposed along the forward edge of said platform for cutting a standing crop and a pair of augers disposed behind and parallel to said cutter for consolidating the cut crop for deposit onto the ground in a windrow; means at one side of said platform for transmitting power from the PTO to one of said augers to rotate said one auger in such direction that its upper surface moves rearwardly to present an upper crop-conveying surface; and means at the opposite side of said platform for transmitting power from said one auger to the other of said augers to rotate said other auger in the same direction as said one auger, whereby the cut crop is conveyed on the upper crop-conveying surfaces for consolidation into a windrow.

6. The subject matter of claim 5, wherein said platform further includes a crop-gathering reel journaled thereon above said cutter for projecting the cut crop rearwardly onto said augers; and means at said opposite side of said platform for transmitting power from said other auger to said reel to rotate said reel in a direction opposite to that of said augers.

7. A crop harvesting machine, comprising: a mobile frame adapted to be coupled to a tractor in baiting relation thereto having power take-off (PTO) means; a crop harvesting platform on said frame adapted to cut a standing crop and deposit the crop onto the ground in a windrow; a cutter extending along the forward edge of said platform; a crop-gathering reel journaled on said platform above said cutter; a pair of crop-conveying augers disposed on the platform rearwardly of said cutter, said augers being disposed in parallel relation one behind the other; a pair of coacting crop conditioner rolls journaled on said platform rearwardly of said augers; a gearbox mounted on said platform at one side thereof and having a forwardly extending power input shaft means adapted to be drivingly connected to the PTO on the tractor, said gearbox including a transversely extending power output shaft; first drive means at said one side of said platform for driving said cutter from said power input shaft means; second drive means at said one side of said platform for driving said conditioner rolls from said power output shaft; third drive means at said one side of said platform for driving the rearmost of said augers from said power output shaft; and fourth drive means at the opposite side of said platform for driving the frontmost of said augers and said reel from said rearmost auger.

8. The subject matter of claim 7 wherein said power input shaft means includes a slip clutch for preventing overloading of the various components.

9. A crop harvesting machine adapted to be coupled to a tractor in trailing relation thereto having power takeoff (PTO) means and including a crop harvesting platform adapted to cut a standing crop and deposit the crop onto the ground in a windrow, the improvement comprising:
  a cutter extending along the forward edge of said platform;
  a crop-gathering reel journaled on said platform above said cutter;
  a pair of crop-conveying augers one behind the other disposed on said platform rearwardly of said cutter;
  a pair of coacting crop conditioner rolls journaled on said platform rearwardly of said augers;
  power input means adapted to be drivingly connected from the PTO of the tractor to one side of the platform;
  first drive means at said one side of said platform for drivingly interconnecting said power input means with said cutter, one of said augers, and said pair of rolls; and
  second drive means at the opposite side of said platform for driving the other of said augers and said reel from said one auger.

* * * * *